(12) United States Patent
Kim

(10) Patent No.: US 10,737,687 B2
(45) Date of Patent: Aug. 11, 2020

(54) VEHICLE AND METHOD FOR CONTROLLING THE SAME

(71) Applicants: Hyundai Motor Company, Seoul (KR); Kia Motors Corporation, Seoul (KR)

(72) Inventor: YongHyun Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 376 days.

(21) Appl. No.: 15/835,911

(22) Filed: Dec. 8, 2017

(65) Prior Publication Data

US 2019/0001963 A1 Jan. 3, 2019

(30) Foreign Application Priority Data

Jun. 29, 2017 (KR) .................. 10-2017-0082254

(51) Int. Cl.
*B60W 10/00* (2006.01)
*B60W 20/50* (2016.01)
*B60W 10/02* (2006.01)
*B60W 20/20* (2016.01)

(52) U.S. Cl.
CPC ............ *B60W 20/50* (2013.01); *B60W 10/02* (2013.01); *B60W 20/20* (2013.01); *B60W 2510/0208* (2013.01); *B60W 2510/0638* (2013.01); *B60W 2510/081* (2013.01)

(58) Field of Classification Search
USPC .............................................. 701/29.1–34.4
See application file for complete search history.

(56) References Cited

U.S. PATENT DOCUMENTS

| | | | | |
|---|---|---|---|---|
| 8,886,374 B2* | 11/2014 | Kim | ......................... | B60K 6/48 701/22 |
| 9,828,924 B1* | 11/2017 | Connolly | ............... | B60W 20/40 |
| 2002/0017406 A1* | 2/2002 | Hisada | .................... | B60K 6/445 180/65.235 |
| 2005/0245349 A1* | 11/2005 | Tabata | ..................... | B60K 6/38 477/3 |
| 2010/0312423 A1* | 12/2010 | Steinhauser | .......... | B60W 10/04 701/22 |
| 2013/0150206 A1* | 6/2013 | Nissato | ................... | F16D 48/06 477/5 |

(Continued)

*Primary Examiner* — Jonathan L Sample
(74) *Attorney, Agent, or Firm* — Mintz Levin Cohn Ferris Glovsky and Popeo, P.C.; Peter F. Corless

(57) ABSTRACT

A vehicle is provided that includes a motor connected to vehicle wheels and configured to generate electrical power. A first rotational speed detector detects rotational speed of the motor and an engine generates mechanical power. A second rotational speed detector detects rotational speed of the engine. A clutch is disposed between the engine and the motor to open and close the connection between the engine and the motor. A controller diagnoses a failure of the clutch and outputs an instruction to open the clutch and an instruction to turn off the engine when the clutch has a failure. The controller determines whether the clutch is successfully opened based on the detected rotational speed of the motor and the detected rotational speed of the engine, executes a series driving mode when that the clutch is successfully opened and speed limit driving when that the clutch has failed to be opened.

23 Claims, 9 Drawing Sheets

(56) References Cited

U.S. PATENT DOCUMENTS

| | | | |
|---|---|---|---|
| 2015/0032358 A1* | 1/2015 | Amemiya | B60W 30/18054 |
| | | | 701/104 |
| 2015/0298690 A1* | 10/2015 | Onouchi | B60K 6/38 |
| | | | 701/22 |
| 2015/0314777 A1* | 11/2015 | Koike | B60W 30/20 |
| | | | 701/22 |
| 2015/0329106 A1* | 11/2015 | Kuwahara | B60K 6/547 |
| | | | 477/5 |
| 2015/0336570 A1* | 11/2015 | Sugimura | B60W 10/08 |
| | | | 701/22 |
| 2015/0360673 A1* | 12/2015 | Yoshida | B60L 50/16 |
| | | | 477/5 |
| 2016/0125670 A1* | 5/2016 | Amano | B60W 30/18027 |
| | | | 701/22 |
| 2016/0280232 A1* | 9/2016 | Amano | B60L 50/60 |
| 2016/0297292 A1* | 10/2016 | Sato | B60K 6/48 |
| 2017/0050635 A1* | 2/2017 | Kitahata | F16H 37/0826 |
| 2017/0113679 A1* | 4/2017 | Hata | B60W 50/032 |
| 2017/0144652 A1* | 5/2017 | Hokoi | B60K 6/445 |
| 2018/0015917 A1* | 1/2018 | Itagaki | B60K 6/445 |
| 2018/0111605 A1* | 4/2018 | Yun | B60W 10/08 |

* cited by examiner

VEHICLE AND METHOD FOR CONTROLLING THE SAME

CROSS-REFERENCE TO RELATED APPLICATION

This application claims priority to and the benefit of Korean Patent Application No. 10-2017-0082254 filed on Jun. 29, 2017, the disclosure of which is incorporated herein by reference in its entirety.

BACKGROUND

1. Field of the Invention

The present disclosure relates to a vehicle and method for controlling the same to ensure safe driving during a clutch failure, and more particularly, to a vehicle and method for controlling the same in which a clutch failure is primarily determined based on a temperature and load and is secondarily determined based on a rotational engine speed and a rotational motor speed.

2. Discussion of Related Art

Generally, vehicles include motor vehicles (general engine-driven vehicles) driven with mechanical power produced by burning oil fuel, such as gasoline and diesel, and eco-friendly vehicles driven by electrical power to reduce the amount of fuel emissions and increase fuel efficiency.

The eco-friendly vehicles include electric vehicles having a rechargeable power unit comprised of a battery and a motor, rotating the motor with electricity charged in the battery, driving the wheels using the rotation of the motor, hybrid vehicles driven by an engine, a battery, and a motor and controlling mechanical power of the engine and electrical power of the motor, and hydrogen fuel cell vehicles.

The hybrid vehicles are driven in an electric vehicle (EV) mode using the motor power, in a hybrid electric vehicle (HEV) mode using both the engine power and the motor power, or in a regenerative braking mode that charges the battery by recovering braking energy from braking or inertial energy from coasting by inertia through generating operation of the motor. When a failure of a clutch that connects the engine and the motor occurs, the failure to open the clutch causes standing start of the vehicle.

SUMMARY

An aspect of the present disclosure provides a vehicle and method for controlling the same, in which a clutch failure may be primarily determined based on a temperature and an amount of load of the clutch and may be secondarily determined based on rotational speed of an engine and rotational speed of a motor.

Another aspect of the present disclosure provides a vehicle and method for controlling the same, by which when the clutch is secondarily determined to have a failure, the vehicle may be driven in a series mode when the clutch is successfully opened and the vehicle is guided to stop when the clutch is not opened. Another aspect of the present disclosure provides a vehicle and method for controlling the same, by which after the vehicle is guided to stop, speed limit driving is performed when the cause of the primary failure of the clutch is resolved and driving is prevented while functions of air conditioning and electric loads are maintained when the cause of the primary failure of the clutch is not resolved.

In accordance with one aspect of the present disclosure, a vehicle may include: a motor connected to vehicle wheels and configured to generate electrical power; a first rotational speed detector configured to detect rotational speed of the motor; an engine configured to generate mechanical power; a second rotational speed detector configured to detect rotational speed of the engine; a clutch disposed between the engine and the motor to open or close the connection between the engine and the motor; and a controller configured to diagnose a failure of the clutch, output an instruction to open the clutch and an instruction to drive off the engine when the clutch has a failure, determine whether the clutch is successfully opened based on the detected rotational speed of the motor and the detected rotational speed of the engine, execute a series driving mode in response to determining that the clutch is successfully opened, and execute a speed limit driving in response to determining that the clutch has failed to be opened.

The controller may be configured to determine that the clutch is successfully opened when the rotational speed of the motor is equal to or greater than a threshold rotational speed and the rotational speed of the engine is equal to zero, and determine that the clutch is failed to be opened when the rotational speed of the motor is less than the threshold rotational speed or the rotational speed of the engine is not equal to zero.

The vehicle may further include a battery configured to supply power to the motor; and a generator configured to start the engine and generate power to charge the battery by receiving power from driving of the engine. The controller may be configured to drive the engine to charge the battery and to drive the motor to transmit the driving power to the vehicle wheels during the series driving mode. The vehicle may further include a speed detector configured to detect vehicle speed. The controller may be configured to determine whether the vehicle is being driven based on the detected vehicle speed and determine whether the clutch is successfully opened in response to determining that the vehicle is being driven.

The controller may be configured to determine whether the clutch is successfully opened when a threshold time elapses from when the instruction to open the clutch is output. The controller may be configured to estimate a temperature of the clutch using a heat model of the clutch stored in advance and diagnose a failure of the clutch based on the estimated temperature. The controller may further be configured to re-diagnose a failure of the clutch in response to determining that the clutch has failed to be opened, execute speed limit driving in response to determining that a cause of the failure of the clutch is resolved, and prevent driving in response to determining that the cause of the failure of the clutch is not resolved. The controller may be configured to execute stop guidance to guide the vehicle to stop in response to determining that the clutch has failed to be opened. The vehicle may further include a display configured to display information corresponding to the stop guidance and information corresponding to the speed limit driving.

In accordance with another aspect of the present disclosure a vehicle may include an engine configured to generate mechanical power; a rotational speed detector configured to detect rotational speed of the engine; a motor connected to vehicle wheels and configured to generate electrical power; a clutch disposed between the engine and the motor for opening or closing the connection between the engine and the motor; and a controller configured to diagnose a failure of the clutch, output an instruction to open the clutch and an instruction to drive off the engine when the clutch has a failure, determine whether the clutch is successfully opened based on the rotational speed of the engine while the vehicle is being driven, execute a series driving mode in response to determining that the clutch is successfully opened, and execute speed limit driving in response to determining that the clutch has failed to be opened.

Further, the controller may be configured to determine that the clutch is successfully opened when the rotational speed of the engine is equal to zero, and determine that the clutch has failed to be opened when the rotational speed of the engine is not equal to zero (e.g., greater than zero). The vehicle may further include a battery configured to supply power to the motor; and a generator configured to start the engine and generate power to charge the battery by receiving power from driving of the engine. The controller may be configured to drive the engine to charge the battery and drive the motor to transmit the driving power to the vehicle wheels during the series driving, and to drive the motor to transmit the driving power to the vehicle wheels during the speed limit driving.

The controller may be configured to estimate a temperature of the clutch using a heat model of the clutch stored in advance and diagnose a failure of the clutch based on the estimated temperature. The controller may then be configured to re-diagnose a failure of the clutch in response to determining that the clutch has failed to be opened (e.g., an opening failure), execute speed limit driving in response to determining that a cause of the failure of the clutch is resolved, and prevent driving in response to determining that the cause of the failure of the clutch is not resolved. The controller may be configured to guide the vehicle to stop in response to determining that the clutch has failed to be opened. The vehicle may further include a display configured to display information that corresponds to the stop guidance and information that corresponds to the speed limit driving.

In accordance with another aspect of the present disclosure, a method for controlling a vehicle including a motor and an engine configured to generate power and a clutch configured to open or close the connection between the engine and the motor, the method, may include: diagnosing a failure of the clutch based on a temperature of the clutch; outputting an instruction to open the clutch and an instruction to drive off the engine when the clutch has a failure; determining a rotational speed of the motor detected by a first rotational speed detector and a rotational speed of the engine detected by a second rotational speed detector; determining that the clutch is successfully opened when the rotational speed of the motor is equal to or greater than a threshold rotational speed and the rotational speed of the engine is equal to zero; determining that the clutch has failed to be opened when the rotational speed of the motor is less than the threshold rotational speed or the rotational speed of the engine is not equal to zero; executing a series driving mode in response to determining that the clutch is successfully opened; and executing speed limit driving in response to determining that the clutch has failed to be opened.

Further, the execution of a series driving mode may include starting the engine by driving a generator; enabling a battery to be charged from the driving of the engine; and driving the motor to transmit the driving power to the vehicle wheels. The method may further include: detecting vehicle speed; determining whether the vehicle is being driven based on the detected vehicle speed; and determining whether the clutch is successfully opened in response to determining that the vehicle is being driven. The execution of speed limit driving may include driving the motor to transmit the driving power to the vehicle wheels; and preventing torque output of the motor when the detected vehicle speed corresponds to a predetermined vehicle speed.

The method may further include: determining whether a threshold time elapses from when the instruction to open the clutch is output when the rotational speed of the motor is equal to or greater than a threshold rotational speed and the rotational speed of the engine is equal to zero; and determining whether the clutch is successfully opened in response to determining that the threshold time elapses. The method may further include: re-diagnosing a failure of the clutch based on a temperature of the clutch in response to determining that the clutch is failed to be opened; executing speed limit driving in response to determining that the failure of the clutch is resolved; and preventing driving in response to determining that the failure of the clutch is not resolved. The method may further include: guiding the vehicle to stop in response to determining that the clutch is failed to be opened; and displaying information that corresponds to the stop guidance and information that corresponds to the speed limit driving.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
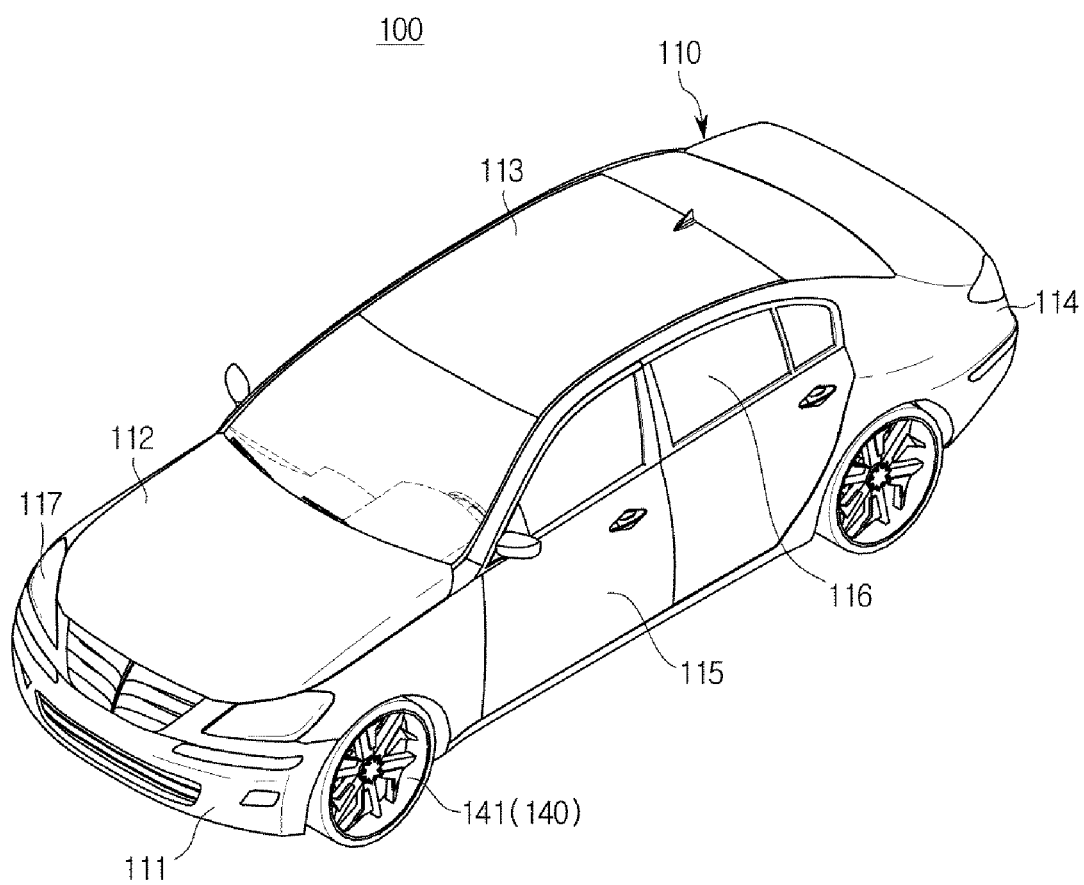
FIG. 1 illustrates an exterior of the body of a vehicle according to an exemplary embodiment of the present disclosure.
Figure 2:
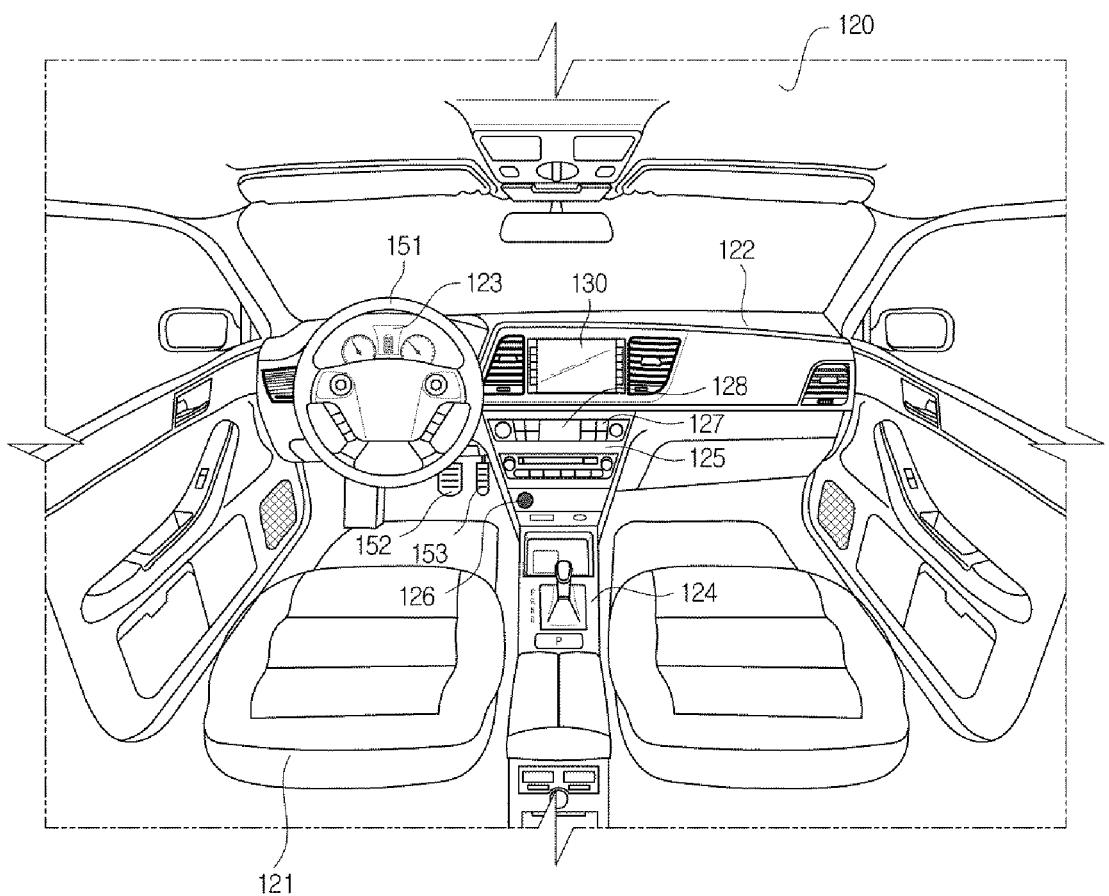
FIG. 2 illustrates an interior of the body of a vehicle according to an exemplary embodiment of the present disclosure.
Figure 3:
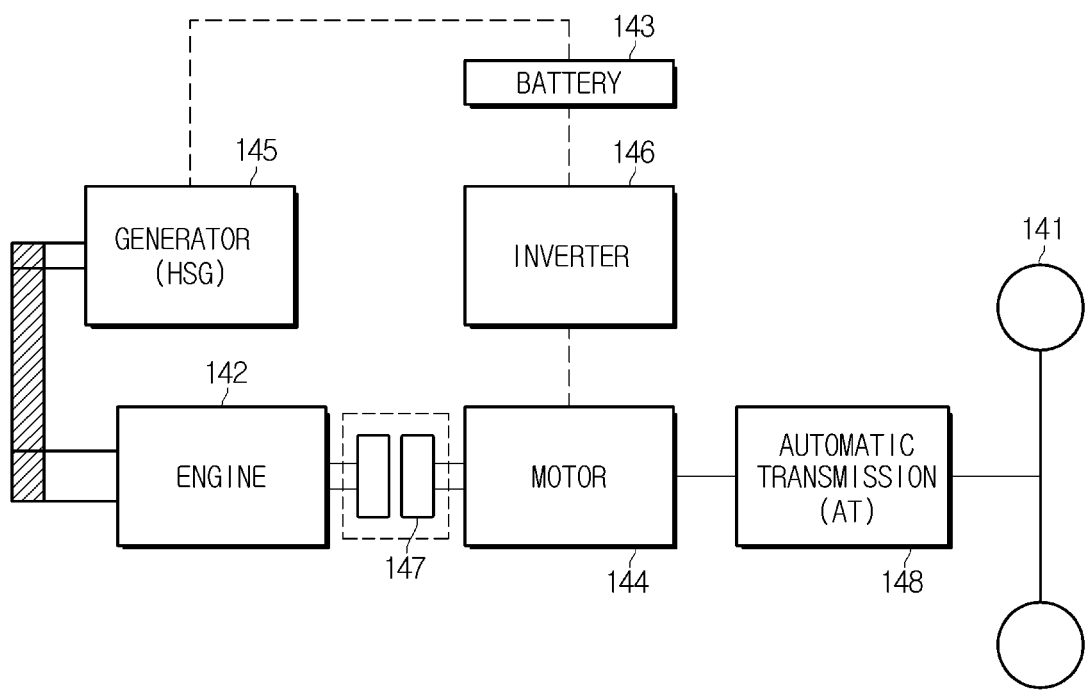
FIG. 3 illustrates a chassis of a vehicle, according to an exemplary embodiment of the present disclosure.

FIG. 1 illustrates an exterior of the body of a vehicle according to an exemplary embodiment of the present disclosure, FIG. 2 illustrates an interior of the body of a vehicle according to an exemplary embodiment of the present disclosure, and FIG. 3 illustrates a chassis of a vehicle, according to an exemplary embodiment of the present disclosure.

A vehicle 100 in an exemplary embodiment may be a hybrid vehicle driven by having an engine, a battery, and a motor and controlling mechanical power of the engine and electric power of the motor. The vehicle 100 may include a vehicle body with exterior and interior parts 110 and 120, and a chassis 140, which is a remaining part except the vehicle body and on which mechanical devices required for driving are installed.

Referring to FIG. 1, the exterior part 110 of the body may include a front panel 111, a hood 112, a roof panel 113, a rear panel 114, front, back, left and right doors 115, and window glasses 116 equipped in the front, back, left and right doors 115 to be opened/closed. The exterior part 110 of the body may also include fillers placed on the border between the window glasses 116 of the doors 115, side mirrors that provide views behind the vehicle 100, and lamps 117 that illuminate a surrounding area and perform a signaling or communication function for other vehicles and pedestrians.

The lamps 117 may be disposed on the front and rear sides of the exterior of the vehicle, including lighting lamps for illuminating far distance, near distance, and backward, signaling lamps for indicating braking, turning, and emergency, and display lamps for indicating vehicle width, vehicle height, and parking situation and lighting the license plate. Lamps mounted on the front of the exterior of the vehicle may include head lamps having high beam lamps and low beam lamps, fog lamps, side lamps, turn signal lamps, and emergency lamps. Lamps mounted on the back of the exterior of the vehicle may include side lamps for indicating the border of width of the vehicle, turn signal lamps, tail lamps, brake lamps, backup lamps, emergency lamps, and a license plate lamp.

Referring to FIG. 2, the interior part 120 of the body may include a plurality of seats 121, a dashboard 122, an instrument panel (or cluster) 123 disposed on the dashboard 122 containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a center fascia 124 having air vents and throttle of an air conditioner (AC) arranged thereon, a head unit 125 disposed on the center fascia 124 for receiving commands to operate the air conditioner (AC) and the audio system, and a starter 126 disposed on the center fascia 124 for receiving a start command.

The vehicle 100 may further include a transmission lever disposed on the center fascia 124 for receiving a manipulation position, and an electronic parking brake (EPB) button disposed around the transmission lever or the head unit 125 for receiving a command to operate an EPB (not shown). The vehicle 100 may further include an input unit 127 configured to receive commands to operate various functions of components within the vehicle. The input unit 127 may be disposed on the head unit 125 and center fascia 124, including at least one mechanical button, such as ON/OFF buttons for operation of various functions, buttons to change settings of various functions, etc.

The input unit 127 may also further include a jog dial (not shown) or a touch pad for the user to enter a command to move or select a cursor displayed on the display of a user interface 130. The jog dial or touch pad may be disposed on the center fascia 124. The vehicle 100 may further include a display 128 disposed in the head unit 125 configured to display information regarding an activated function and information input by the user. The user interface 130 may be further equipped in the vehicle for user convenience. The user interface 130 may be installed in the dash board 122 or may be attached to the dash board 122.

The user interface 130 may include a display panel and a touch panel for user input. For example, the user interface 130 may include the display panel only, or may include a touch screen in which the touch panel is integrated with the display panel. When the user interface 130 includes the display panel only, the user interface 130 may be configured to receive a selection of button displayed on the display panel using the input unit 127 disposed in the center fascia. When the user interface 130 includes the touch screen, the user interface 130 may be configured to directly receive an operation command from the user through the touch panel. The user interface 130 may also be used to perform audio function, video function, navigation function, Digital Multimedia Broadcasting (DMB) function, and radio function, and to display a navigation image and road modeling image in the cruise control mode. The user interface 130 may also be configured to display information regarding a function (e.g., a function of a vehicle component such as an air conditioner or the like) being performed and information input by the user.

Furthermore, the chassis 140 of the vehicle is a frame that supports the vehicle body 110, 120, with vehicle wheels 141 disposed at front and rear and on the left and right of the vehicle, a power system 142 to 147 to apply driving power to the vehicle wheels 141, a steering system, a braking system for applying braking power to the vehicle wheels 141, and a suspension system. The power system 142 to 147 is a system configured to generate driving power required for driving the vehicle and adjusting the generated driving power.

As shown in FIG. 3, the power system may include an engine 142, a fuel system (not shown), a cooling system (not shown), a refueling system (not shown), a battery 143, a motor 144, a generator 145, an inverter 146, a clutch 147, an automatic transmission 148, and an axle, and may further include an actuator 149 for driving the clutch 147.

The engine 142 burns oil fuel, such as gasoline and diesel to generate mechanical power, and transfers the power to the clutch 147. The battery 143 produces power with high-tension current, and supplies the power to the motor 144, generator 145, and various types of electric devices in the vehicle. The battery 143 may be charged by receiving power supplied from the generator 145. The motor 144 may be configured to generate turning force (also called rotational power) using electric energy from the battery 143, and delivers the turning force to the vehicle wheels 140 to drive the vehicle wheels 140.

Once connected to the engine 142 by the clutch 147, the motor 144 delivers turning force of the engine 142 to the vehicle wheels 141 together with the engine 142. The motor 144 may also be configured to absorb a shock from closing of the clutch 147 while performing a function of the conventional torque converter. The motor 144 may also be configured to convert the electric energy from the battery 143 to mechanical energy to operate various types of electric devices mounted in the vehicle. The motor 144 may also operate as a generator under an energy regenerative condition due to braking, deceleration, or low-speed driving, enabling the battery 143 to be charged.

The generator 145 is a starter generator, a hybrid starter generator (HSG) in particular, which may be connected to a crank shaft of the engine 142, engaged with the crank shaft of the engine 142 and may operate as a starter motor when the engine 142 is started, and may operate as a generator by the engine 142 to enable the battery 143 to be charged when the vehicle wheels 141 are not driven by the engine 142. In other words, the generator 145 may operate as a generator by the power delivered through the engine 142, enabling the battery 143 to be charged.

The vehicle may also be configured to charge the battery 143 by receiving and using power from a charger located in a parking lot or a charging place (e.g., receive power from an external charger). The power system of the vehicle may further include a power converter (not shown) configured to convert the power generated by the generator 145 to a rechargeable power for the battery 143 and convert power from the battery 143 to driving power for the generator 145. The power converter may include a converter. The power converter may also be configured to change the direction and output of current between the generator 145 and the battery 143.

The inverter 146 may be configured to invert the power from the battery 143 to a driving power for the motor 144. The inverter 146 may further be configured to output the driving power for the motor 144 based on a target vehicle speed from a user instruction. The driving power for the motor 144 may be a switching signal to output a current that corresponds to the target vehicle speed and a switching signal to output a voltage that corresponds to the target vehicle speed. Accordingly, the inverter 146 may include a plurality of switching devices.

The clutch 147 may be disposed between the engine 142 and the motor 144. The clutch 147 may be closed or locked when both the engine 142 and the motor 144 are used to generate driving power for the vehicle wheels 141, and may be opened by a spring (not shown) pushed back by a fluid pressure produced by driving of the actuator 149, e.g., a hydraulic clutch actuator (HCA), when the driving power for the vehicle wheels 141 is generated using the motor 144. In other words, the clutch 147 may be opened or closed based on a driving mode of the vehicle.

In particular, the clutch 147 may be opened during slow-down or low-speed driving using the motor 144 or even when the vehicle is decelerated, and may be closed for climbing driving, acceleration driving, and constant speed driving at more than a particular speed. The clutch 147 may be of a normal close type enabling the engine 142 and the motor 144 to be connected to each other when the power of the vehicle is off. Alternatively, the clutch 147 may be a dry type clutch.

The automatic transmission (AT) 148 may be configured to transmit turning motions of the engine 142 and motor 144 to the vehicle wheels 141, or transmit a turning motion of the motor 144 to the vehicle wheels 141. The AT 148 automatically performs optimal torque conversion to enable the gear to be automatically operated based on the driving speed. The vehicle may further include a differential gear (not shown) disposed between the AT 148 and the vehicle wheels 141, and the differential gear may be configured to generate respective driving power for the left and right vehicle wheels by adjusting a gear ratio and transmit the generated driving power to the respective left and right vehicle wheels.

The power system of the vehicle in the exemplary embodiment forms a parallel structure, in which both the engine 142 and the motor 144 are connected to the axle of the vehicle to drive the vehicle at the same time. In the EV mode or series mode where the vehicle is driven by the motor 144, the vehicle opens the clutch 147 to prevent the motor 144 and the engine 142 from being mechanically engaged, thereby delivering the rotation of the motor 144 directly to the AT 148. The engine 142 may be driven off at this time, and may be driven on when the battery is charged.

Furthermore, the vehicle 100 closes the clutch 147 when driven by operation of both the engine 142 and the motor 144 (in the HEV mode), for the rotational power (or turning force) of the engine 142 to be added to the turning force of the motor 144 and then transmitted to the AT 148. Even while the vehicle 100 is driven by the engine 142, the vehicle 100 closes the clutch 147 for the engine 142 to be rotated together with the motor 144 since the engine 142 needs to be connected to the axle. The vehicle 100 may include a steering wheel 151 of the steering system configured to adjust the driving direction, a brake pedal 152 engaged by the user to decelerate the vehicle, and an accelerator pedal 153 engaged by the user to accelerate the vehicle (see FIG. 2).

Figure 4:
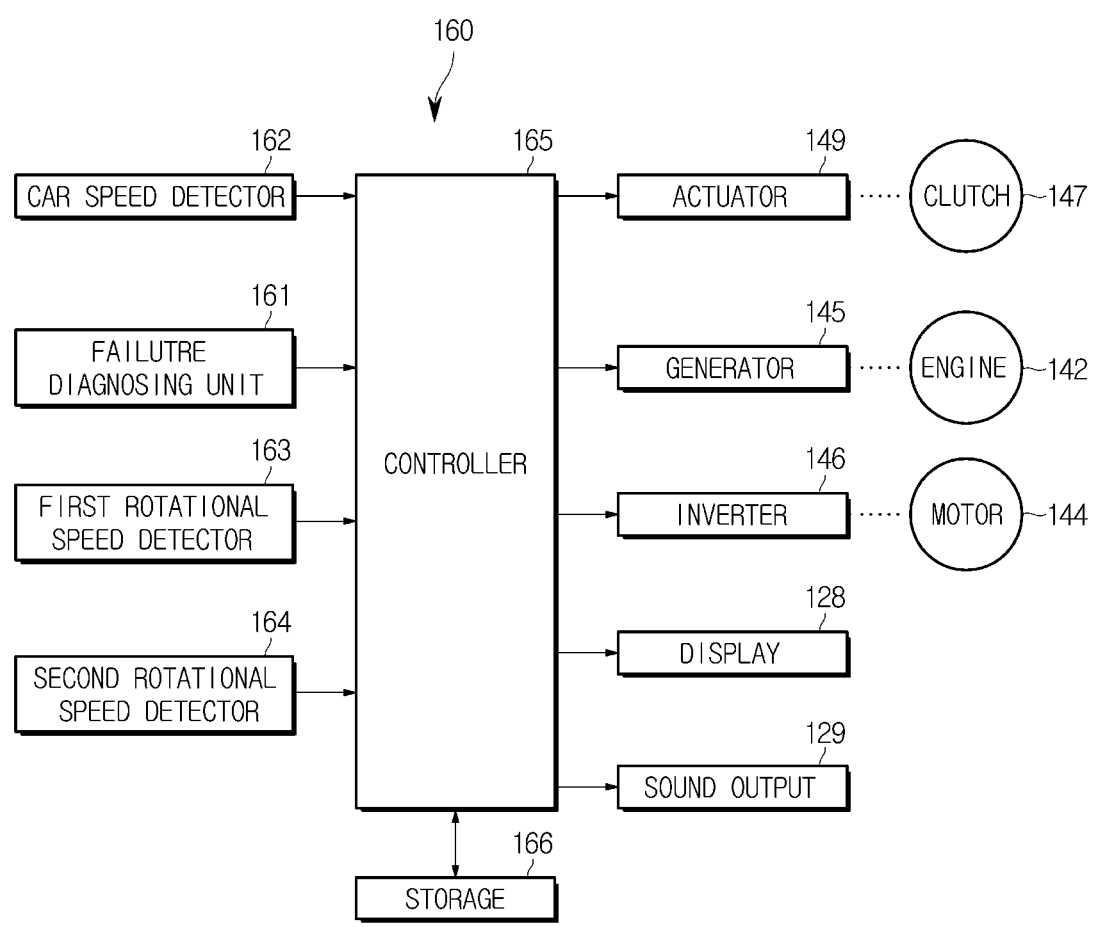
FIG. 4 is a control block diagram of a vehicle, according to an exemplary embodiment of the present disclosure.
Figure 5:
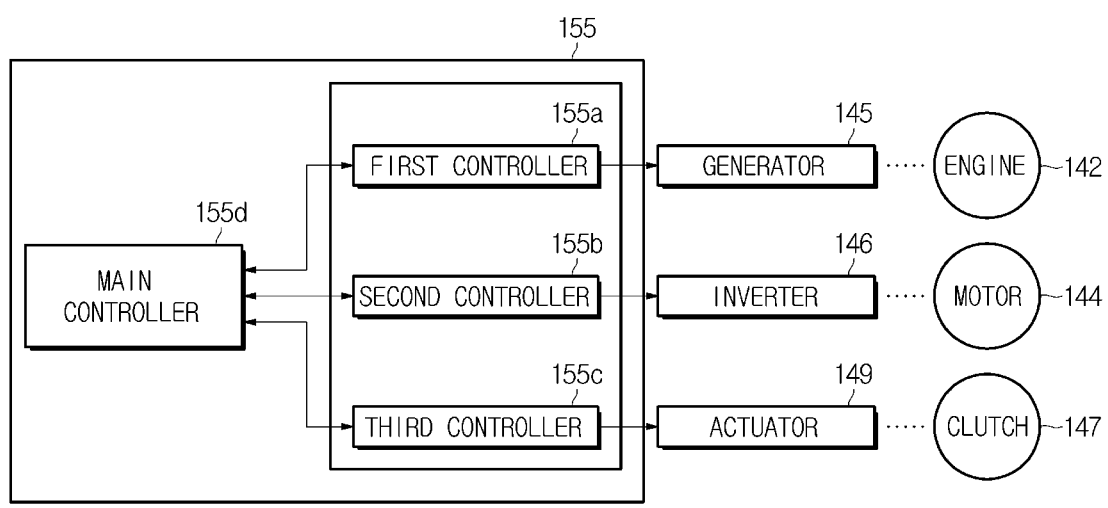
FIG. 5 is a detailed block diagram of a controller shown in FIG. 4 according to an exemplary embodiment of the present disclosure.

FIG. 4 is a control block diagram of a vehicle, according to an exemplary embodiment of the present disclosure, and FIG. 5 is a detailed block diagram of a controller shown in FIG. 4. The vehicle 100 may include a power control device 160 configured to operate the power system, and the power control device 160 may include a failure diagnosing unit 161, a vehicle speed detector 162, a first rotational speed detector 163, a second rotational speed detector 164, a controller 165, and a storage 166. The controller 165 may be configured to operate the other components of the power control device 160.

The vehicle 100 may further include a display 128 and a sound output unit 129 configured to output operational information of the power system. The failure diagnosing unit 161 may be configured to primarily diagnose or detect a failure of the clutch 147. The clutch failure includes a state in which the clutch 147 is unavailable to be opened or closed. The failure diagnosing unit 161 may be configured to determine whether the clutch 147 is in a slip state or in an overheated state to diagnose a failure of the clutch 147.

The failure diagnosing unit 161 may then be configured to estimate the temperature of the clutch 147, determine that the clutch 147 is in the overheated state when the estimated temperature is equal to or greater than a threshold temperature, and determine when the clutch 147 is in the slip state based on the information of the determined overheated state. The failure diagnosing unit 161 may also be configured to estimate the temperature of the clutch 147 using a heat model of the clutch 147. Modelled clutch temperature >380° C. for dry clutch (Depending on clutch material)

The failure diagnosing unit 161 may further be configured to detect at least one of current, rotational speed, and torque of the motor equipped in the actuator 149, and estimate the temperature of the clutch 147 based on the information of the detected condition. The failure diagnosing unit 161 may also be configured to directly detect the temperature of the clutch 147 using a temperature sensor and determine when the clutch 147 is in the overheated state based on the detected temperature.

The vehicle speed detector 162 may be configured to detect driving speed of the vehicle and may include sensors attached onto the vehicle wheels 141 each to detect the rotation speed of the wheel, and an acceleration detector configured to detect acceleration speed of the vehicle. The first rotational speed detector 163 may be configured to detect rotational speed of the motor 144 and may be disposed on a rotation shaft 144a of the motor 144 connected to the clutch 147 to detect rotational speed of the rotation shaft 144a of the motor 144. The second rotational speed detector 164 may be configured to detect rotational speed of the engine 142 and may be disposed on an output shaft 142a of the engine 142 connected to the clutch 147 to detect rotational speed of the output shaft 142a of the engine 142.

The controller 165 may be configured to obtain pressure information of the accelerator pedal 153 or the brake pedal 152 when the accelerator pedal 153 or the brake pedal 152 is engaged by the user, obtain a target speed of the vehicle based on the obtained pressure information and the driving speed, i.e., vehicle speed, detected by the vehicle speed detector 162, and operate at least one of the engine 142 and the motor 144 based on the obtained target speed of the vehicle for the vehicle to be driven by the power generated by at least one of the engine 142 and the motor 144.

The controller 165 may further be configured to operate the vehicle to be driven in the EV mode using the power of the motor 144 or in the HEV mode using the power of both the motor 142 and the engine 142, based on the target speed of the vehicle, whether the vehicle is accelerated, and/or whether the vehicle is climbing the hill (e.g., being driven on an inclined road surface). To perform the EV mode, the controller 165 may be configured to open the clutch 147 and adjust the rotational speed of the motor 144 based on the target speed. To perform the HEV mode, the controller 165 may be configured to close the clutch 147 and adjust the rotational speed of the engine 142 and the rotational speed of the motor 144 based on the target speed.

The controller 165 may then be configured to determine a failure of the clutch when switching the driving mode between the EV mode and the HEV mode. Specifically, when switching from the EV mode to the HEV mode, the controller 165 may be configured to determine whether the opened clutch is unavailable to be changed into the closed state based on the diagnosis information of the failure diagnosing unit 161, and when switching from the HEV mode to the EV mode, the controller 165 may be configured to determine whether the closed clutch is unavailable to be changed into the opened state based on the diagnosis information of the failure diagnosing unit 161.

In response to primarily determining that the clutch has a failure by which a state change of the clutch is unavailable, the controller 165 may be configured to output an open instruction to the clutch 147, turn off the engine 142, and secondarily diagnose a failure of the clutch 147. Specifically, the controller 165 may be configured to secondarily diagnose a failure of the clutch 147 based on the vehicle speed detected by the vehicle speed detector, rotational speed of the motor detected by the first rotational speed detector, and rotational speed of the engine detected by the second rotational speed detector.

Diagnosing a failure of the clutch 147 for the second time may include determining whether opening of the clutch in response to the clutch open instruction is successful or failed. The controller 165 may be configured to determine that the vehicle is being driven when the vehicle speed detected by the vehicle speed detector is equal to or greater than the threshold vehicle speed. When the rotational speed of the motor detected during the driving is equal to or greater than a threshold rotational speed and the rotational speed of the engine is equal to zero, the controller 165 may be configured to determine that the diagnosis time exceeds a threshold time and determine that the clutch is opened normally (e.g., without failure) in response to determining that the diagnosis time exceeds the threshold time.

Furthermore, the controller 164 may also be configured to determine a target rotational speed of the motor that corresponds to the target speed of the vehicle while the vehicle is being driven, determine a rotational speed range that corresponds to the determined target rotational speed, and determine that opening of the clutch has failed when the detected rotational speed is beyond the determined rotational speed range or determine that opening of the clutch is successful when the detected rotational speed is within the determined rotational speed range.

The controller 165 may further be configured to determine whether the rotational power of the motor output to the AT corresponds to rotational power of the motor due to the success of opening the clutch or to rotational power from engagement of the motor and the engine due to the failure of opening the clutch. Moreover, when the rotational speed of the engine detected while the vehicle is being driven is zero, the controller 165 may be configured to determine that the clutch is opened normally.

In response to determining that opening of the clutch is successful after the clutch is primarily diagnosed to have a failure, the controller 165 may be configured to operate the generator to operate the engine and operate the generator to perform a generator function by the operation of the engine, enabling the battery to be charged, and operate the inverter based on the target speed to operate the motor, thereby driving the vehicle in the series mode. Alternatively, in response to determining that opening of the clutch is successful after the clutch is primarily diagnosed to have a failure, the controller 165 may be configured to operate the inverter based on the target speed to operate the motor, thereby driving the vehicle in the series mode, and operate the generator based on a charging level of the battery while the vehicle is driven in the series mode to operate the engine and operate the generator to perform a generator function by the operation of the engine, enabling the battery to be charged.

The vehicle may further include a charging level detector (not shown) configured to detect a charging level of the battery 143 and output charging level information that corresponds to the detected charging level. The charging level detector may include at least one of a current detector configured to detect battery current and a voltage detector configured to detect battery voltage. In response to determining that opening of the clutch has failed after the clutch is primarily diagnosed to have a failure, the controller 165 may be configured to prevent the acceleration torque output and operate the display 128 to output and display (e.g., visually) stop guidance information for guiding the vehicle to stop.

The controller 165 may also be configured to operate the sound output 129 to output the stop guidance information in sound. In response to determining that opening of the clutch has failed after the clutch is primarily diagnosed to have a failure, the controller 165 may be configured to determine whether a cause of the clutch failure is resolved, and operate the vehicle to be driven at a limited speed to prevent the vehicle from being driven at more than a predetermined speed limit and operate the display to display the speed limit information in response to determining that the cause of the clutch failure is resolved.

Additionally, in response to determining that the cause of the clutch failure is not resolved, the controller 165 may be configured to prevent driving of the vehicle or operate the vehicle to be on standby for driving, and output the information regarding the driving prevention or the standby for driving. In this particular, the controller 165 may be configured to operate the electric devices such as air conditioner, user interface, audio system, and the like within the vehicle, to be maintained by adjusting output of the battery. The controller 165 may further be configured to determine the temperature of the clutch and determine whether the cause of the clutch failure is resolved based on the determined temperature of the clutch.

The controller 165 may be implemented with a memory (not shown) configured to store an algorithm to operate the components in the vehicle 100 or data regarding a program that implements the algorithm, and a processor (not shown) carrying out the aforementioned operation using the data stored in the memory. The memory and the processor may be implemented in separate chips. Alternatively, the memory and the processor may be implemented in a single chip.

As shown in FIG. 5, the controller 155 may include a first controller 155a, an engine control unit (ECU) configured to operate the generator 145 and the engine 142, a second controller 155b, an motor control unit (MCU) configured to operate the inverter 146 based on a control signal from a main controller to rotate the motor 144 and perform regenerative braking during braking or slowdown of the vehicle 100, a third controller 155c, a local control unit configured to operate the actuator 149 to open or close the clutch 147, and the main controller 155d, an HEV control unit (HCU) configured to distribute torque to the engine 142 and the motor 144 based on the target speed for the vehicle 100 and output control signals to the first, second, and third controllers based on the distributed torque and monitoring the battery 143.

The first controller 155a may be configured to operate the generator 145 based on a control signal from the main controller 155d to start the engine and adjust driving of the engine based on a control signal from the main controller 155d. When the clutch 147 is in the closed state, the engine 142 delivers the generated power to the vehicle wheels 141, and when the clutch 147 is in the opened state, the engine 142 delivers the generated power to the generator 145. The generator 145 may be configured to start the engine 142 based on a control signal from the first controller 155a, or charge the battery while performing the generator function according to the engine power.

The second controller 155b may be configured to execute switching of the inverter 146 based on the control signal from the main controller 155d. The second controller 155b may further be configured to estimate rotational speed of the motor based on the output signal from the inverter 146 or estimate rotational speed of the motor based on the target speed of the vehicle sent from the main controller 155d. The inverter 146 may be configured to convert direct current (DC) power supplied from the battery 143 to 3-phase alternate current (AC) power based on a control signal from the second controller 155b, and applies the AC power to the motor 144.

The third controller 155c may be configured to operate the motor (not shown) in the actuator 149 based on the control signal from the main controller 155d. The third controller 155c may include the failure diagnosing unit 161 configured to diagnose a failure of the clutch. The actuator, HCA 149, moves oil to the clutch 147 by driving a local motor, thereby producing a fluid pressure within the clutch 147. The fluid pressure produced within the clutch 147 pushes a spring (not shown) back in the clutch 147, which makes the clutch 147 opened.

The main controller 155d may be configured to close the clutch 147 by operating the actuator 149 based on a control signal provided over a network, and adjust the pressure of a fluid supplied to the clutch 147 to open or close the clutch 147, thereby performing EV mode driving or the HEV mode driving. The main controller 155d may also be configured to obtain a charging level of the battery based on information regarding at least one of voltage and current of the battery. The main controller 155d may be configured to manage a state of charging (SoC) of the battery by detecting current, voltage, temperature, etc., of each battery cell in an operation range of the battery 143, and adjust the charging or discharging voltage of the battery not to be overcharged up to more than a voltage limit or over-discharged down to less than a voltage limit, thereby preventing shortening of the battery life span.

When switching into the HEV mode is required based on a target speed and an SoC of the battery while the clutch is in the normal state in the EV driving mode, the main controller 155d may be configured to operate the third controller 155c to close the clutch 147 mounted between the engine 142 and the motor 144 for the vehicle to be driven in the HEV mode. Additionally, the first, second, and third controllers 155a, 155b, and 155c, and the main controller 155d may be formed as an integrated control unit.

In particular, the controllers 155 may be an electronic control unit (ECU) configured to operate the vehicle, or one of a micro controller, a central processing unit (CPU), and a processor. The storage 166 may be configured to store a threshold vehicle speed, a threshold motor rotational speed, and a threshold time. The storage 166 may also be configured to store a heat model of the clutch 147. The storage 166 may be a memory implemented with a chip separate from the aforementioned processor in relation to the controller 165, or may be implemented integrally with the processor in a single chip.

Furthermore, the display 128 may be configured to display the EV mode using the power of the motor 144, and the HEV mode using power of both the engine 142 and the motor 144. The display 128 may further be configured to display a failure of the clutch 147 and display the series mode, the stop guidance information, the speed limit information, and the driving prevention information. The display 128 may be one arranged in the head unit 125, or in the cluster 123, or in the user interface. The display 128 may be an extra lamp equipped in the interior of the vehicle. The sound output 129 may be configured to output information that corresponds to the driving mode in sound and output information that corresponds to a clutch failure in sound. The sound output 129 may also be configured to output information regarding a change in driving mode, stop guidance information, speed limit information, and driving prevention information in respective sound. The sound output 129 may be a speaker mounted in the vehicle or a speaker in the user interface 130.

Figure 6A:
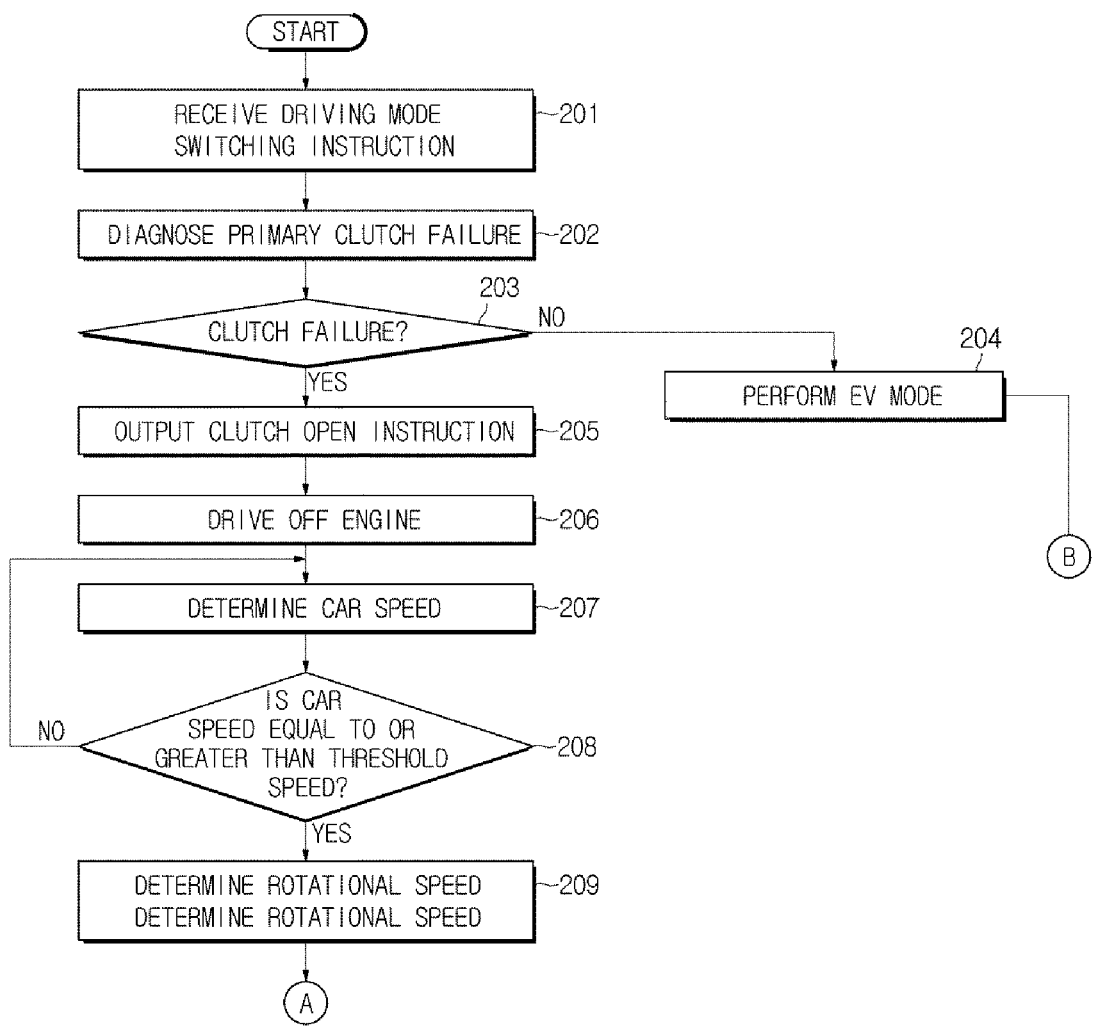
FIG. 6A and FIG. 6B are a flowchart illustrating a method for controlling a vehicle, according to an exemplary embodiment of the present disclosure.
Figure 6B:
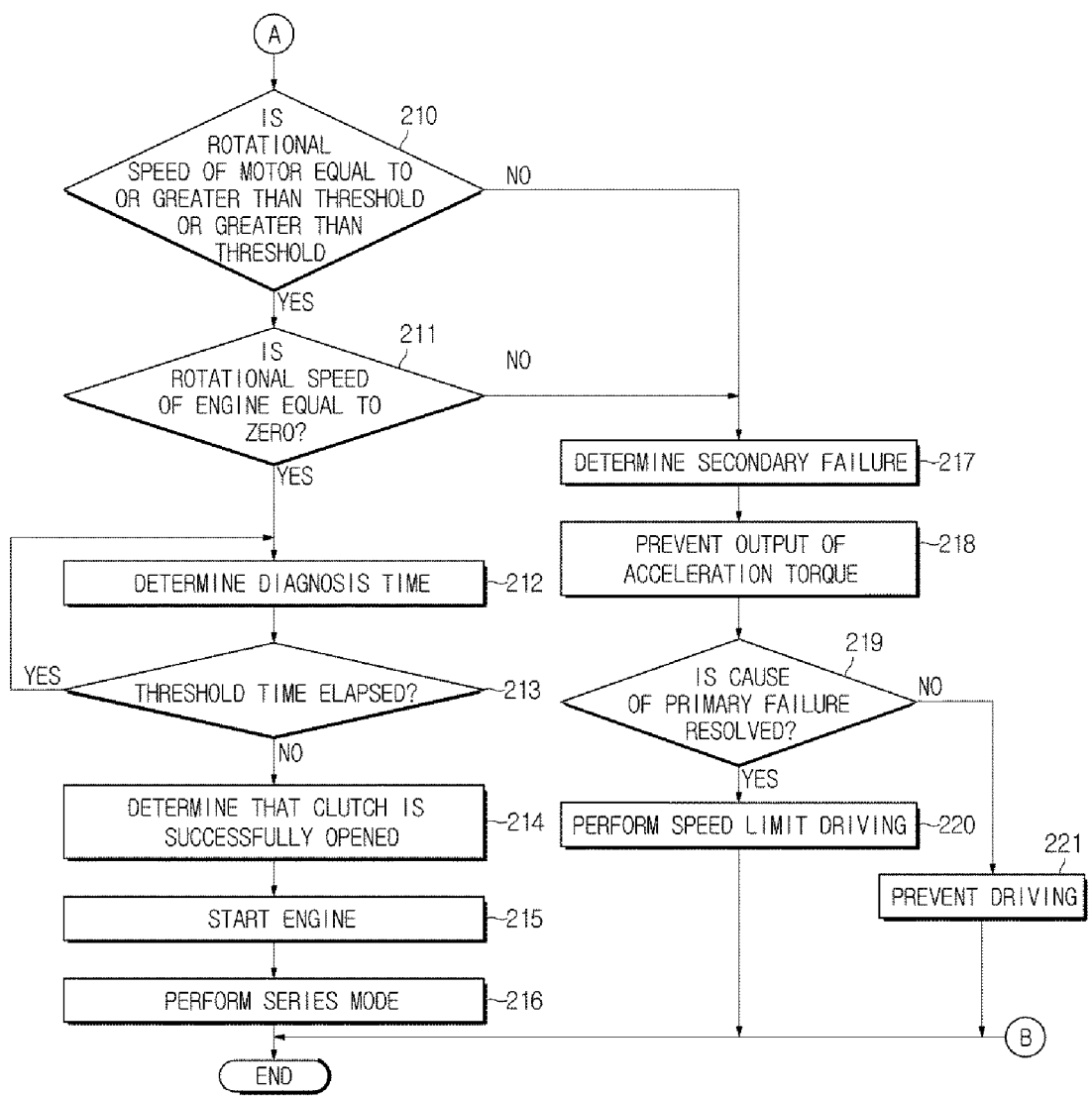

FIG. 6A and FIG. 6B are a flowchart illustrating a method for controlling a vehicle, which will be described in connection with FIGS. 7 and 8. The method described herein below may be executed by an overall controller within the vehicle. When the button of the starter 126 is on or engaged, the vehicle uses battery power to drive the motor 144 and supplies the battery power to various electric devices mounted in the vehicle 100. The vehicle may also start by the engine 142 by operating the generator 145 in the winter season (i.e., when the outside temperature is below a set temperature) or when the charging level of the battery 143 is less than a threshold charging level.

In particular, the vehicle may be configured to obtain a target speed of the vehicle that corresponds to pressure exerted onto the accelerator pedal 153 or the brake pedal 152, operate at least one of the clutch 147, the engine 142, and the motor 144 based on the obtained target speed, and may be driven by the power of at least one of the engine 142 and the motor 144. The vehicle may be driven in the HEV mode when the target speed is equal to or greater than a certain speed (i.e., when the vehicle is driven at high speed), when the vehicle is accelerated and/or when the vehicle being driven on an inclined road surface; the vehicle may be driven in the EV mode when the target speed is less than the certain speed (i.e., when the vehicle is driven at low speed); the vehicle may be configured to perform regenerative braking when a command to reduce speed or to brake is entered by engaging brake pedal 152.

Figure 7:
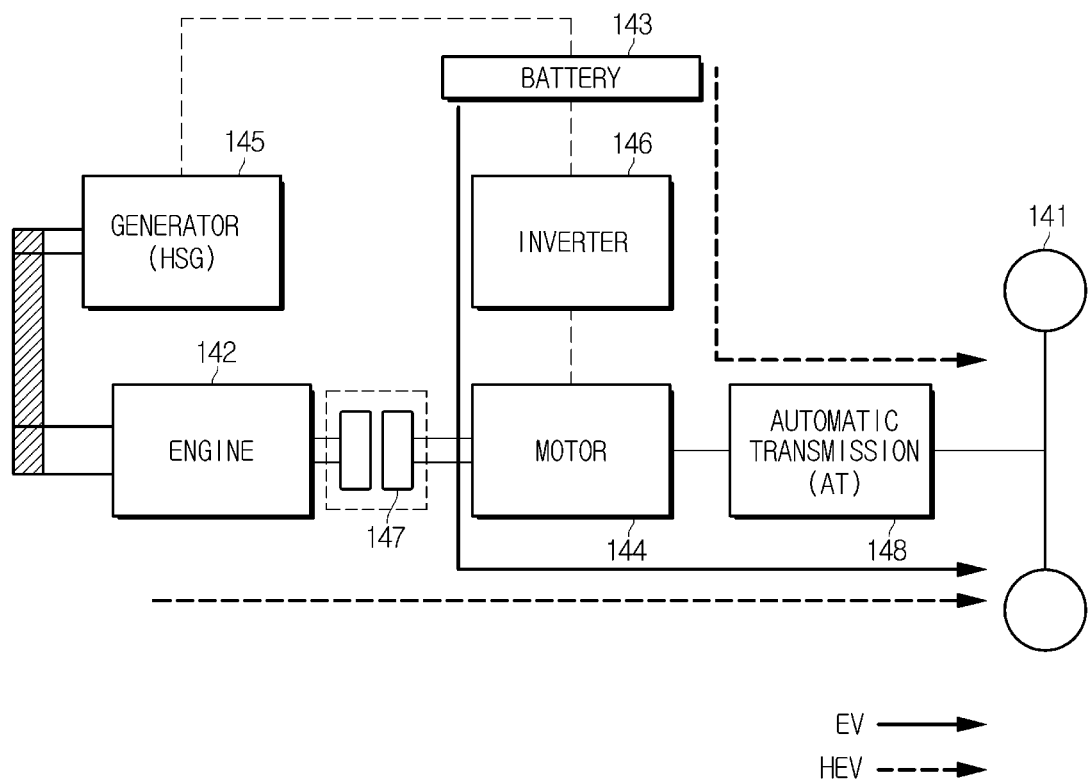
FIGS. 7 and 8 illustrate driving modes of a vehicle, according to an exemplary embodiment of the present disclosure.

As shown in FIG. 7, the HEV mode is a mode to close the clutch 147 and to drive the vehicle using the power of the engine 42 and the motor 144 to drive the vehicle wheels 141, and the EV mode is a mode to open the clutch 147 and to drive the vehicle using the power of the motor 144 to drive the vehicle wheels 141. When the brake pedal 151 is engaged, the vehicle 100 may be configured to detect a fluid pressure of a master cylinder (not shown) with a pressure sensor, calculate a target braking power based on the detected fluid pressure, determine a rotational power that corresponds to part of the target braking power, and perform regenerative braking based on the determined rotational power.

The target braking power may be produced by the regenerative braking and the braking system. In particular, the motor 144 may operate as a generator to charge the battery 143. When stopped, the vehicle 100 stops operation of the motor 144 and the engine 142. The vehicle switches between the HEV mode and the EV mode based on the target speed, and/or whether the vehicle is accelerated and/or being driven on an inclined road surface. Specifically, when the HEV driving mode is changed to the EV mode, the main controller 155*d* of the vehicle may be configured to transmit a signal to switch into the EV mode to the third controller 155*c*. As the driving mode of the vehicle is changed to the EV mode, the third controller 155*c* may be configured to open the clutch 147 to disengage the clutch 147 and the engine 142 for the vehicle to be driven with the power of the motor 144.

In particular, the third controller 155*c* may be configured to transmit an instruction to the motor (not shown) mounted in the actuator 149 to rotate in a first direction. As the motor of the actuator 149 is rotated, a screw connected to the driving shaft of the motor is rotated together. As the screw is rotated, a force is applied in a direction to push a piston equipped in the actuator to press the oil in a cylinder of the actuator. Subsequently, as the piston of the actuator advances, oil in a master cylinder is pressed, and accordingly, the oil in the master cylinder passes a tube and presses a release fork equipped in the clutch 147 to open the clutch 147 from the engine 142 and only the motor 144 of the vehicle 144 is operated, changing the driving mode to the EV mode.

When the EV driving mode is changed to the HEV mode, the main controller 155*d* of the vehicle may be configured to transmit a signal to switch into the HEV mode to the third controller 155*c*. As the driving mode of the vehicle is changed to the HEV mode, the third controller 155*c* may be configured to close the clutch 147 to engage the clutch 147 and the engine 142 for the vehicle to be driven with the power of both the engine 142 and the motor 144. The third controller 155*c* may be configured to transmit an instruction to the motor of the actuator to rotate in a second direction, and as the motor is rotated in the second direction, the piston is pushed back. As the piston is pushed back, the pressure in the master cylinder is reduced. As the pressure of the master cylinder decreases, the oil moves back to the master cylinder along the path of the tube, and as a result, the pressure to the release fork is released and the clutch 147 is engaged with the engine 142 again, thereby switching to the HEV mode. When performing switching between the HEV mode and the EV mode, the vehicle may be configured to primarily diagnose a failure of the clutch 147.

In other words, the vehicle may be configured to determine when the clutch 147 is unavailable to be changed into the closed state from the opened state when changing the driving mode to the HEV mode from the EV mode, and determine when the clutch 147 is unavailable to be changed into the opened state from the closed state when changing the driving mode to the EV mode from the HEV mode.

Since standing start, which is not intended by the user, occurs more frequently when the clutch is changed into the opened state from the closed state than when the clutch is changed into the closed state from the opened state, an example of diagnosing a clutch failure at a time when the closed state of the clutch is changed to the opened state will now be described. In response to receiving an instruction to change the driving mode to the EV mode from the HEV mode in 201, the vehicle may be configured to primarily diagnose a failure of the clutch in 202. The diagnosis of a failure of the clutch may include estimating a temperature of the clutch using a heat model of the clutch.

The vehicle may then be configured to determine whether the clutch has a failure based on the result of the failure diagnosis, in 203, and open the clutch when the clutch is normal and perform driving in the EV mode by operating the motor 144, in 204. The determination that the clutch is normal may include determining that an estimated temperature of the clutch is less than a threshold temperature. In response to determining that the clutch has a failure, the vehicle may be configured to output an instruction to open the clutch to the actuator in 205, turn off the engine 142 in 206, and secondarily diagnose a failure of the clutch 147.

The determination that the clutch has a failure may include determining that the clutch is overheated and has a failure from the overheated state when an estimated temperature of the clutch is equal to or greater than a threshold temperature. For example, the determination that the clutch has a failure further may include determining that the clutch is overheated from occurrence of slip of the clutch when an estimated temperature of the clutch is equal to or greater than a threshold temperature.

The secondary diagnosis of a failure of the clutch 147 may include determining whether opening of the clutch in response to the instruction to open the clutch is successful or failed. In particular, the vehicle may be configured to secondarily diagnose a failure of the clutch 147 based on the vehicle speed detected by the vehicle speed detector, rotational speed of the motor detected by the first rotational speed detector, and rotational speed of the engine detected by the second rotational speed detector.

More specifically, the vehicle may be configured to determine whether the vehicle is being driven. In other words, the vehicle may be configured to determine a vehicle speed detected by the vehicle speed detector in 207, and determine whether the determined vehicle speed is equal to or greater than a threshold vehicle speed in 208, and when the determined vehicle speed is equal to or greater than the threshold vehicle speed, determine that the vehicle is being driven.

In response to determining that the vehicle is being driven, the vehicle may be configured to determine rotational speed of the motor detected by the first rotational speed detector and rotational speed of the engine detected by the second rotational speed detector in 209, and determine whether the detected rotational speed of the motor is equal to or greater than a threshold rotational speed in 210. In response to determining that the detected rotational speed of the motor is equal to or greater than the threshold rotational speed, the vehicle may be configured to determine whether the rotational speed of the engine is zero in 211 and determine a time for the secondary failure diagnosis in response to determining that the rotational speed of the engine is zero in 212.

The vehicle may then be configured to determine whether the time for the secondary failure diagnosis exceeds a threshold time in 213, and determine that opening of the clutch is successfully performed when the time for the failure diagnosis exceeds the threshold time in 214. The determination of whether the time for failure diagnosis exceeds the threshold time may include determining whether the time taken to open the clutch elapses. Subsequently, the vehicle may be configured to operate the generator to turn on ignition of the engine in 215, charge the battery using the power of the engine when the engine is driven, and operate the inverter based on the target speed to operate the motor, thereby driving in the series mode by the power of the motor in 216.

Figure 8:
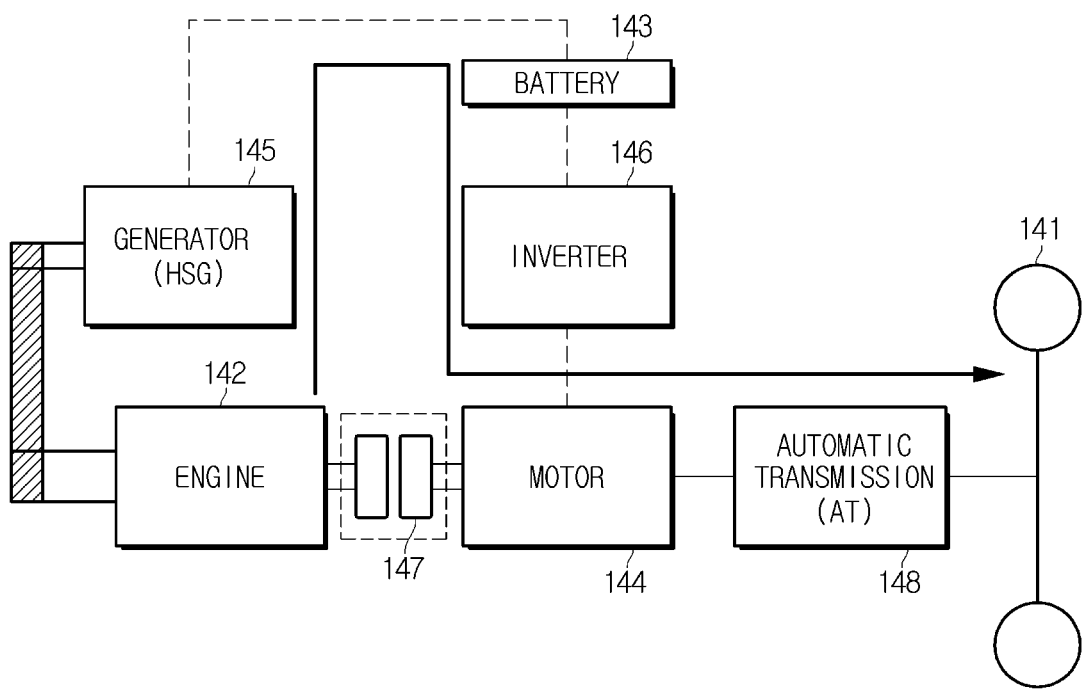

As shown in FIG. 8, the series mode is a mode to transmit the power of the engine 142 to the generator 145, enabling the generator 145 to perform the generator function to charge the battery 143, using the power of the battery 143 to rotate the motor 144, transmitting the rotational power of the motor to the vehicle wheels 141, thereby driving the vehicle with the rotational power of the motor. In the series mode, engagement of the engine and the motor is released while the clutch is in the opened state, to transmit the power of the engine to the generator instead of the motor. Execution of the series mode may further include outputting the power of the battery to the inverter, converting the DC power of the battery to AC power that corresponds to target speed in the inverter to output the AC power to the motor 144, and rotating the motor 144 based on the AC power.

It may also be possible for the vehicle to operate the engine 142 to charge the battery only when the charging level of the battery is less than a threshold charging level while in the series mode. In response to determining that the rotational speed of the motor is less than a threshold rotational speed or that the rotational speed of the engine is not zero, the vehicle may be configured to determine that the clutch has a secondary failure, in 217.

In particular, although the engine is turned off due to occurrence of clutch slip since the opening of the clutch is failed, the rotational power of the motor may be transmitted to the engine, rotating the output shaft of the engine while the motor may be rotated at a lower speed than the target rotational speed due to engagement with the engine, and thus, the vehicle may be configured to diagnose a failure of the clutch for the second time based on the rotational speed of the motor and the rotational speed of the engine.

Subsequently, the vehicle may prevent acceleration torque output of the motor in 218 and may perform stop guidance. The vehicle may be configured to display at least one of information regarding prevention of acceleration torque output and stop guidance information. The vehicle may also be configured to output the at least one of information regarding prevention of acceleration torque output and stop guidance information in a sound version through the sound output. The prevention of acceleration torque output refers to preventing an increase in the vehicle speed by preventing output of acceleration torque when the driving speed of the vehicle reaches a predetermined driving speed.

The vehicle may further be configured to estimate the temperature of the clutch using a heat model of the clutch while preventing output of the acceleration torque and determine whether a cause of the primary failure of the clutch is resolved based on the estimated temperature, in 219. In particular, the vehicle may be configured to determine that the cause of the primary failure is resolved when the estimated temperature is less than a threshold temperature, and determine that the cause of the primary failure is not resolved when the estimated temperature is equal to or greater than the threshold temperature.

In response to determining that the cause of the clutch failure is resolved, the vehicle may be configured to adjust speed limit driving to prevent driving at more than a predetermined speed limit, in 220, and display the speed limit information through the display. The predetermined speed limit may be the same as a preset speed at the time when output of the acceleration torque is prevented. Additionally, in response to determining that the cause of the clutch failure is not resolved, the vehicle may be configured to prevent driving or operate the vehicle on standby for driving, in 221, and output information regarding the prevention of driving or standby for driving through the display and the sound output. At this time, the vehicle may be configured to continuously supply power of the battery to electric devices, such as air conditioner, user interface, and audio system to maintain operation thereof.

According to the present disclosure, even when a clutch failure occurs when the hybrid vehicle is switched into the EV mode from the HEV mode, the hybrid vehicle may be switched into a series mode, which ensures safe driving without standing start. Additionally, a mechanical clutch slip or clutch failure may be correctly determined based on the rotational speed of the engine and the rotational speed of the motor, which enables the vehicle to be driven in series mode while stably supplying power to the vehicle. According to the present disclosure, in response to determining that the clutch has a failure and that opening of the clutch is unavailable, acceleration torque output may be prevented and the vehicle may be guided to stop, thereby avoiding accidents due to standing start.

Furthermore, according to the present disclosure, when a cause of the primary clutch failure is resolved, the vehicle speed may be limited to enable the vehicle to be driven for a certain period of time and to prevent the frequent recurrence of overheating of the clutch. When the cause of the primary clutch failure is not resolved, driving may be prevented while operation of air conditioning and electric parts is maintained, thereby increasing safety for the user while minimizing inconvenience to the user. Accordingly, the present disclosure may increase the quality and marketability of the vehicle, and may further increase satisfaction of the user, thereby securing product competitiveness.

Although the present disclosure is described with reference to some exemplary embodiments as described above and accompanying drawings, it will be apparent to those ordinary skilled in the art that various modifications and changes may be made to the exemplary embodiments. For example, the aforementioned method may be performed in different order, and/or the aforementioned systems, structures, devices, circuits, etc., may be combined in different combinations from what is described above, and/or replaced or substituted by other components or equivalents thereof, to obtain appropriate results. Therefore, other implementations, other embodiments, and equivalents thereof may fall within the following claims.

What is claimed is:

1. A vehicle, comprising:
   a motor connected to vehicle wheels and configured to generate electrical power;
   a first rotational speed detector configured to detect rotational speed of the motor;
   an engine configured to generate mechanical power;
   a second rotational speed detector configured to detect rotational speed of the engine;
   a clutch disposed between the engine and the motor to open and close the connection between the engine and the motor; and
   a controller configured to diagnose a failure of the clutch, output an instruction to open the clutch and an instruction to turn off the engine when the clutch has a failure, determine whether the clutch is successfully opened based on the detected rotational speed of the motor and the detected rotational speed of the engine, execute a series driving mode in response to determining that the clutch is successfully opened, and execute speed limit driving in response to determining that the clutch has failed to be opened.

2. The vehicle of claim 1, wherein the controller is configured to determine that the clutch is successfully opened when the rotational speed of the motor is equal to or greater than a threshold rotational speed and the rotational speed of the engine is equal to zero, and determine that the clutch has failed to be opened when the rotational speed of the motor is less than the threshold rotational speed or the rotational speed of the engine is not equal to zero.

3. The vehicle of claim 1, further comprising:
   a battery configured to supply power to the motor; and
   a generator configured to start the engine and generate power to charge the battery by receiving power from driving of the engine,
   wherein the controller is configured to drive the engine to charge the battery and to drive the motor to transmit the driving power to the vehicle wheels in the series driving mode.

4. The vehicle of claim 1, further comprising:
   a speed detector configured to detect vehicle speed,
   wherein the controller is configured to determine whether the vehicle is being driven based on the detected vehicle speed and determine whether the clutch is successfully opened in response to determining that the vehicle is being driven.

5. The vehicle of claim 1, wherein the controller is configured to determine whether the clutch is successfully opened when a threshold time elapses from when the instruction to open the clutch is output.

6. The vehicle of claim 1, wherein the controller is configured to estimate a temperature of the clutch using a heat model of the clutch stored in advance and diagnose a failure of the clutch based on the estimated temperature.

7. The vehicle of claim 6, wherein the controller is configured to re-diagnose a failure of the clutch in response to determining that the clutch has failed to be opened, execute speed limit driving in response to determining that a cause of the failure of the clutch is resolved, and prevent driving in response to determining that the cause of the failure of the clutch is not resolved.

8. The vehicle of claim 1, wherein the controller is configured to guide the vehicle to stop in response to determining that the clutch h failed to be opened.

9. The vehicle of claim 8, further comprising:
   a display configured to display information that corresponds to the stop guidance and information that corresponds to the speed limit driving.

10. A vehicle, comprising:
    an engine configured to generate mechanical power;
    a rotational speed detector configured to detect rotational speed of the engine;
    a motor connected to vehicle wheels and configured to generate electrical power;
    a clutch disposed between the engine and the motor to open and close the connection between the engine and the motor; and
    a controller configured to diagnose a failure of the clutch, output an instruction to open the clutch and an instruction to drive off the engine when the clutch has a failure, determine whether the clutch is successfully opened based on the rotational speed of the engine while the vehicle is being driven, execute a series driving mode in response to determining that the clutch is successfully opened, and execute speed limit driving in response to determining that the clutch has failed to be opened.

11. The vehicle of claim 10, wherein the controller is configured to determine that the clutch is successfully opened when the rotational speed of the engine is equal to zero, and determine that the clutch has failed to be opened when the rotational speed of the engine is greater than zero.

12. The vehicle of claim 10, further comprising:
    a battery configured to supply power to the motor; and
    a generator configured to start the engine and generate power to charge the battery by receiving power from driving of the engine,
    wherein the controller is configured to operate the engine to charge the battery and operate the motor to transmit the driving power to the vehicle wheels during the series driving mode, and to operate the motor to transmit the driving power to the vehicle wheels during the speed limit driving.

13. The vehicle of claim 10, wherein the controller is configured to estimate a temperature of the clutch using a heat model of the clutch stored in advance and diagnose a failure of the clutch based on the estimated temperature.

14. The vehicle of claim 13, wherein the controller is configured to re-diagnose a failure of the clutch in response to determining that the clutch has failed to be opened, execute speed limit driving in response to determining that a cause of the failure of the clutch is resolved, and prevent driving in response to determining that the cause of the failure of the clutch is not resolved.

15. The vehicle of claim 10, wherein the controller is configured to guide the vehicle to stop in response to determining that the clutch has failed to be opened.

16. The vehicle of claim 15, further comprising:
a display configured to display information that corresponds to the stop guidance and information that corresponds to the speed limit driving.

17. A method for controlling a vehicle including a motor and an engine configured to generate power and a clutch configured to open or close the connection between the engine and the motor, the method comprising:
diagnosing, by a controller, a failure of the clutch based on a temperature of the clutch;
outputting, by the controller, an instruction to open the clutch and an instruction to turn off the engine when the clutch has a failure;
determining, by the controller, a rotational speed of the motor detected by a first rotational speed detector and a rotational speed of the engine detected by a second rotational speed detector;
determining, by the controller, that the clutch is successfully opened when the rotational speed of the motor is equal to or greater than a threshold rotational speed and the rotational speed of the engine is equal to zero;
determining, by the controller, that the clutch has failed to be opened when the rotational speed of the motor is less than the threshold rotational speed or the rotational speed of the engine is greater than zero;
executing, by the controller, a series driving mode in response to determining that the clutch is successfully opened; and
executing, by the controller, speed limit driving in response to determining that the clutch has failed to be opened.

18. The method of claim 17, wherein executing of the series driving mode includes:
starting, by the controller, the engine by operating a generator;
enabling, by the controller, a battery to be charged from the operation of the engine; and
operating, by the controller, the motor to transmit the driving power to the vehicle wheels.

19. The method of claim 17, further comprising:
detecting, by the controller, a vehicle speed;
determining, by the controller, whether the vehicle is being driven based on the detected vehicle speed; and
determining, by the controller, whether the clutch is successfully opened in response to determining that the vehicle is being driven.

20. The method of claim 19, wherein executing of the speed limit driving includes:
operating, by the controller, the motor to transmit the driving power to the vehicle wheels; and
preventing, by the controller, torque output of the motor when the detected vehicle speed corresponds to a predetermined vehicle speed.

21. The method of claim 17, further comprising:
determining, by the controller, whether a threshold time elapses from when the instruction to open the clutch is output if the rotational speed of the motor is equal to or greater than a threshold rotational speed and the rotational speed of the engine is equal to zero; and
determining, by the controller, whether the clutch is successfully opened in response to determining that the threshold time elapses.

22. The method of claim 17, further comprising:
re-diagnosing, by the controller, a failure of the clutch based on a temperature of the clutch in response to determining that the clutch has failed to be opened;
executing, by the controller, the speed limit driving in response to determining that the failure of the clutch is resolved; and
preventing, by the controller, driving in response to determining that the failure of the clutch is not resolved.

23. The method of claim 22, further comprising:
guiding, by the controller, the vehicle to stop in response to determining that the clutch has failed to be opened; and
displaying, by the controller, information that corresponds to the stop guidance and information that corresponds to the speed limit driving.

* * * * *